(12) United States Patent
Masters

(10) Patent No.: US 6,390,725 B1
(45) Date of Patent: May 21, 2002

(54) FASTENER FOR PERMANENTLY SECURING COMPOSITE GRATINGS TO STRUCTURAL MEMBERS

(75) Inventor: Rodney H. Masters, Houston, TX (US)

(73) Assignee: AIMS International, Inc., Houston, TX (US)

( * ) Notice: Subject to any disclaimer, the term of this patent is extended or adjusted under 35 U.S.C. 154(b) by 0 days.

(21) Appl. No.: 09/419,853

(22) Filed: Oct. 19, 1999

(51) Int. Cl.[7] ................................................ B25G 3/36
(52) U.S. Cl. ........................... 403/403; 52/202; 52/507; 52/656.8; 52/664; 52/698; 248/224.8
(58) Field of Search ................ 403/403; 52/202, 52/507, 656.8, 664, 698; 248/224.8

(56) References Cited

U.S. PATENT DOCUMENTS

| | | | |
|---|---|---|---|
| 1,567,446 A | | 12/1925 | McClure |
| 1,707,533 A | * | 4/1929 | Nagin |
| 2,075,588 A | * | 3/1937 | Meyers |
| 2,705,550 A | * | 4/1955 | Joseph |
| 3,309,119 A | | 3/1967 | Phillips ................. 287/189.35 |
| 3,367,078 A | * | 2/1968 | Thompson |
| 3,742,671 A | * | 7/1973 | Ellis |
| 4,185,435 A | | 1/1980 | Schiffers, Jr. ................. 52/507 |
| 4,221,038 A | | 9/1980 | Singer et al. ................. 29/160 |
| 5,118,147 A | * | 6/1992 | Correll |
| 5,291,714 A | | 3/1994 | Wright et al. ................. 52/664 |
| 5,732,523 A | * | 3/1998 | Masters et al. |
| 5,911,664 A | * | 6/1999 | Masters et al. |

OTHER PUBLICATIONS

Admitted Prior Art, handrwritten pages from application 08/654730.*

* cited by examiner

Primary Examiner—Lynne H. Browne
Assistant Examiner—Tomlyne A Malcolm
(74) Attorney, Agent, or Firm—Fulbright & Jaworski LLP

(57) ABSTRACT

An apparatus for permanently securing a grating sheet having parallel and transverse bars that form a pattern of openings to a structural member. The apparatus includes an elongated generally L-shaped connector having an upper plate section generally rectangular in shape for mounting on an upper surface of the grating sheet and a downwardly extending sidewall formed integrally with the plate section and adapted to extend along a longitudinal edge of the grating sheet. The L-shaped connector also can include a plurality of downwardly extending teeth formed integrally with the plate section and spaced apart from each other for insertion in between the grating bars. At least one generally right-angled brace is attached to the outer surface of the sidewall for permanently securing the L-shaped connector to the structural member. The brace has an edge configured to conform to an outer surface of the structural member, wherein the apparatus is formed of corrosion resistant material and is able to withstand the forces of waves in a wave-zone portion of an offshore platform.

11 Claims, 2 Drawing Sheets

FASTENER FOR PERMANENTLY SECURING COMPOSITE GRATINGS TO STRUCTURAL MEMBERS

SPECIFICATION

1. Field of the invention

The present invention relates to a fastening system for securing a grating to a structural support member, and more particularly, to a fastener for permanently securing fiberglass gratings to a walkway or landing in the wave zone area of an offshore platform or other similar platforms located in chemical plants, docks, refineries and elsewhere, where the gratings are subjected to wave pressures exerted by storm wave action or other hydraulic forces.

2. Background of the Invention

Grating sheets or panels are used in a variety of applications such as in walkways on offshore platforms. Due to its structural strength, a metallic grating has typically been used to form the walking surface of a walkway. Metallic gratings are typically secured to its supporting steel members by tack-welding the grating to the supporting steel members at designated intervals. These "tack-welds," or the weld affected areas require touch-up painting and it is these ouch-up areas that generally break down first, creating a corrosion cell. However, due to this corrosion caused by deterioration of the paint system, a metallic grating is often not desirable. Although the metallic grating is typically galvanized or painted, the paint eventually wears, chips or fades or otherwise succumbs to corrosion primarily at the weld-affected areas. Fabricating the grating out of a non-corrosive metal, such as stainless steel, is expensive and impractical for a large walkway.

For providing support, a typical walkway has longitudinal structural support members, most often pipe members, extending along the edge of the walkway and transverse members extending between and reinforcing the longitudinal structural support members. The grating is placed on top of these structural support members. As previously stated, metallic gratings are typically secured to the structural support members by tack-welding the grating to the transverse supports at every 3rd or 4th support and 6 inch intervals along the longitudinal members.

Currently, the solution to the above-discussed corrosion problem typically involves replacing the metallic grating with grating formed from a fiberglass material which is resistant to corrosion and furnishes firm support for the walkway. However, the fiberglass grating introduces additional problems, as the above-described system for mounting the metallic grating does not work when fiberglass grating is used. as the fiberglass grating cannot be welded. Placing the fiberglass grating on top of the structural support pipe members and securing it in place with clips, such as described in U.S. Pat. No. 5,118,147, does not firmly secure the grating in the offshore platform environment subjected to severe wave action. The circular motion of waves that constantly wash through the grating subjects it to multidirectional forces that eventually displaces the grating from the clips and the grating washes out.

Other prior art includes the use of flexible bands to secure the fiberglass grating to the underlying crossbar support members. However, the use of flexible bands require a worker to go beneath the grating to secure the grating to the supporting structure. Working beneath the grating can be quite hazardous in an offshore platform environment. Also. this system secures the grating vertically but not laterally and with constant wave action, lateral movement of the grating occurs which produces a "saw cutting" phenomenon that continues until the flexible bands saw through the grating.

It would be desirable to have a system for securing the fiberglass gratings to the support members of the platform that would not only be corrosion resistant but would also be able to withstand the forces of the waves in the wave-zone areas of the platform The "wave-zone" is the portion of an offshore structure that, in the event of a hurricane, typhoon or any other violent storm, could be under water as a wave passes through the platform. In a typical platform in the Gulf of Mexico the elevation of this potion of the platform could be as high as 40 to 50 feet above the mean low water level. When large waves pass through the platform, they exert extremely high horizontal and vertical pressures on the platform structure and any appurtenances such as the grating system.

It would further be desirable to have a fastening system for permanently securing fiberglass gratings to the support members of the platform that would not only be corrosion resistant but would also be able to withstand the forces of the waves in the wave-zone areas of the platform.

SUMMARY OF THE INVENTION

The present invention is directed to an apparatus for permanently securing a grating sheet having parallel and transverse bars that form a pattern of openings to a structural member. The present apparatus includes an elongated generally L-shaped connector having an upper plate section generally rectangular in shape for mounting on an upper surface of the grating sheet and a downwardly extending sidewall formed integrally with the plate section and adapted to extend along a longitudinal edge of the grating sheet. The L-shaped connector also can optionally include a plurality of downwardly extending teeth formed integrally with the plate section and spaced apart from each other for insertion in between the grating bars. At least one generally right-angled brace is attached to the outer surface of the sidewall for permanently securing the L-shaped connector to the structural member. The brace has an edge configured to conform to an outer surface of the structural member, wherein the improved apparatus is formed of corrosion resistant material and is able to withstand the forces of waves in a wave-zone portion of an offshore platform.

DETAILED DESCRIPTION OF INVENTION

Figure 1:
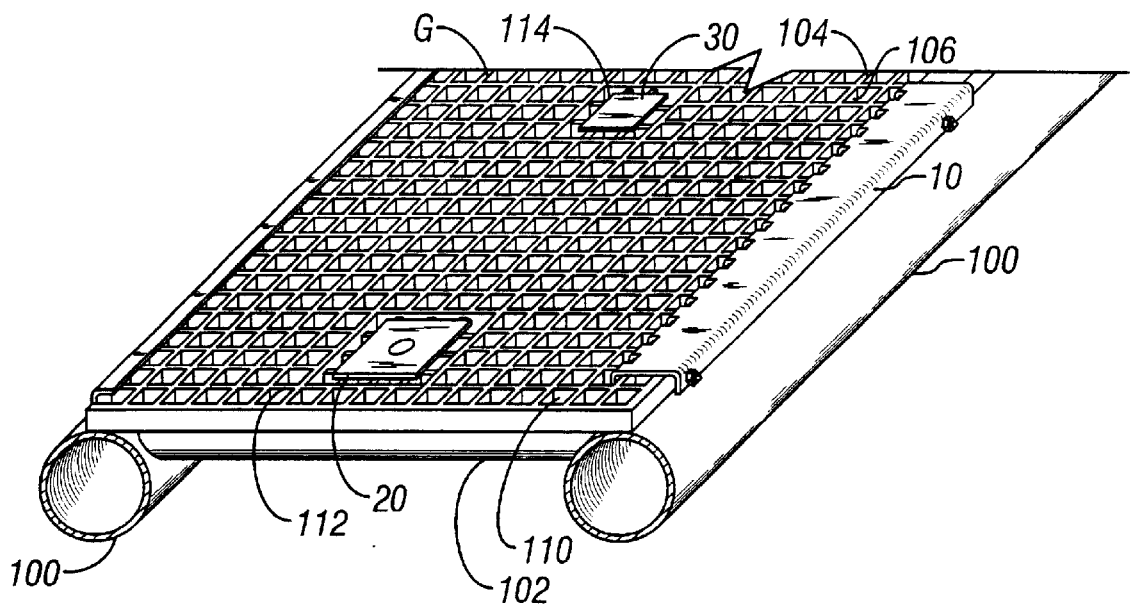
FIG. 1 is a perspective view of a section of an offshore platform or other walkway illustrating a removable fastening system.

This invention is related to the fastening systems described and claimed in U.S. Pat. Nos. 5,732,523 and 5,911,664, which are herein fully incorporated by reference. The fastening systems of these two patents are removable in that the fasteners can be unbolted and removed from the support members of a platform. A portion of a walkway of an offshore platform is shown in FIG. 1. The walkway has a grating G supported by two underlying parallel. spaced structural support members 100 located and extending along each edge of the walkway. The walkway is reinforced by structural transverse members 102 which are welded to and extend between the structural support members 100. Typically, these transverse members 102 are framed in to be flush on top with the support members 100.

The grating G forming the walkway is formed from fiberglass in order to inhibit corrosion of the floor of the walkway by salt water. However, as can be appreciated, the grating G could also be made of metal or any other structural material. The grating G has bars 104 extending parallel to the structural support members 100 and crossbars 106 extending perpendicularly to the structural support members 100. Thus. bars 104 and 106 form a uniform grid pattern having preferably uniform adjacent square or rectangular grid openings of 110.

A removable edge fastener 10 secures the edge of the grating G to one of the structural support members 100 and plate fasteners 20 and 30 secure the grating G to the transverse members 102. In a preferred embodiment. all of the fasteners 10, 10A, 20, and 30 are formed of steel such as stainless or carbon steel or any other corrosion resistant material. Depending upon the installment situation, the removable edge fasteners 10 can be used either alone or in combination with the plate fasteners 20 and/or 30.

Figure 2:
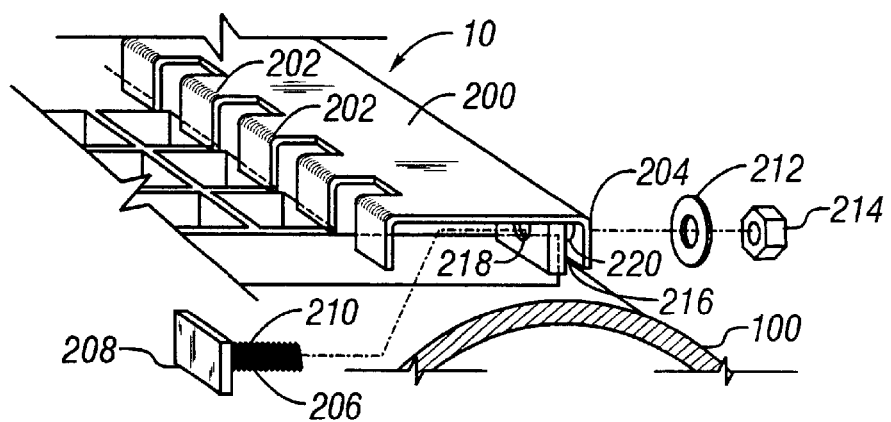
FIG. 2 is a partial cross sectional view of an existing embodiment of an edge fastener illustrated in FIG. 1.

As illustrated in FIG. 2. the removable edge fastener 10 is an elongated, generally L-shaped member that attaches to both the edge of the grating G and the support member 100. The edge fastener 10 includes a rectangular upper plate section 200 with a rectangular sidewall 204 integral with the plate section 200. The sidewall 204 extends downwardly from the plate section 200 along the edge of the grating G parallel to the support members 100. In a preferred embodiment the height of the sidewall 204 is approximately equal to or slightly greater than the thickness of the grating G.

Plate section 200 laterally extends over the grating G from the edge of the grating G at preferably a distance greater than the spacing of one length of bar 104. In one embodiment, a plurality of downwardly extending teeth or claws 202 can be located at the inner edge of the plate section 200. opposite the sidewall 204. In a preferred embodiment, the teeth or claws 202 are spaced such that each one of the claws 202 extends downwardly inside one grid opening 110 when the plate section 200 extends over the grating G. The edge fastener 10 securely clamps the grating G to the structural member 100 regardless of the direction of the wave forces. The combination of the plate section 200, the sidewall 204 and the row of extending claws 202 forms a generally U-shaped edge fastener 10. The claws 202 can be machined or welded or otherwise attached to the longitudinal plate section 200.

Sidewall 204 of the removable edge fastener 10 is secured to the structural support member 100 through one or more rectangular tabs 216 which are welded to the supporting surface of the support member 100. Each tab 216 is approximately the same height as the thickness of the grating G and includes a hole 218 through which bolts 206 secure the edge fastener 10 to the tab 216. For each tab 216, the sidewall 204 has an associated horizontal hole or slot 220 for receiving the bolt 206 therethrough and to facilitate positioning the edge fastener 10 along the support member 100.

To secure the grating G to the support member 100, each tab 216 is first welded to the upper surface of the structural support member 100 so as to extend upwardly and parallel to the axis of the support member 100 and edge of the grating G. Bolts 206 are then positioned such that each bolt 206 extends through the hole 218 of the tab 216, and the grating G is set in place. Edge fastener 10 is placed over each corresponding tab 216 and protruding bolts 206 such that the surface of the sidewall 204 closest to the grating G abuts the tab 216. The bolts 206 thus will extend through the corresponding horizontal slot 220 of the sidewall 204.

The edge fastener 10 is adjusted longitudinally along support member 100 so that each one of the claws 202 extends downwardly inside one grid opening 110. Bolts 206 are then tightened in place. A disk-shaped washer 212 is located between the nut 214 and the adjacent surface of the sidewall 204. Utilizing the fastener system 10 of FIGS. 1–2, the edge fasteners 10 extend along each of the support members 100 and grip the edges of the grating G along the length of the generally rectangular edge fastener 10. As can be appreciated, a worker can install the edge fastener 10 to the grating G without having to work beneath the support members 100 or the grating G. Likewise, to remove the edge fasteners 10, the bolts 206 are simply removed from tabs 216 and the edge supports 10 and the gratings G are removed without having to work beneath the support members 100 or grating G.

Figure 3:
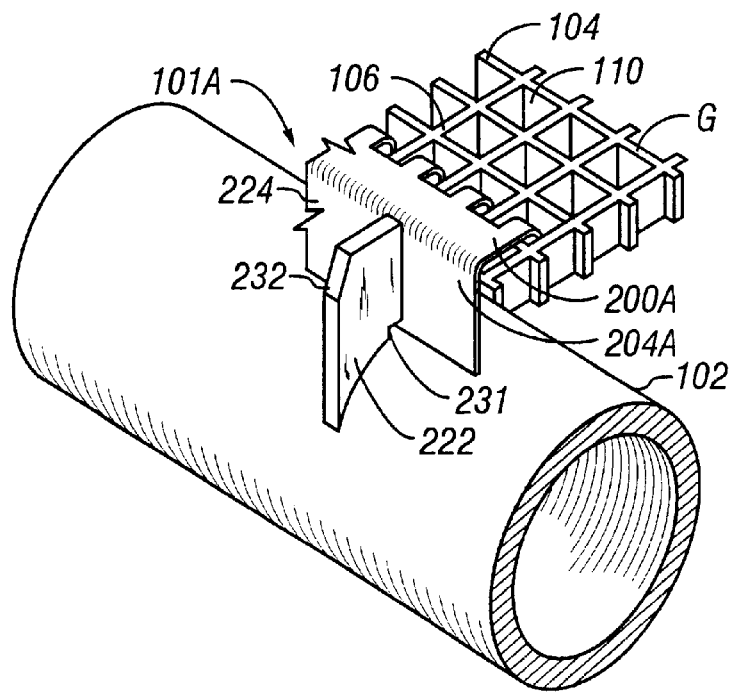
FIG. 3 is a perspective view of a section of a permanent edge fastener of the subject invention.
Figure 4:
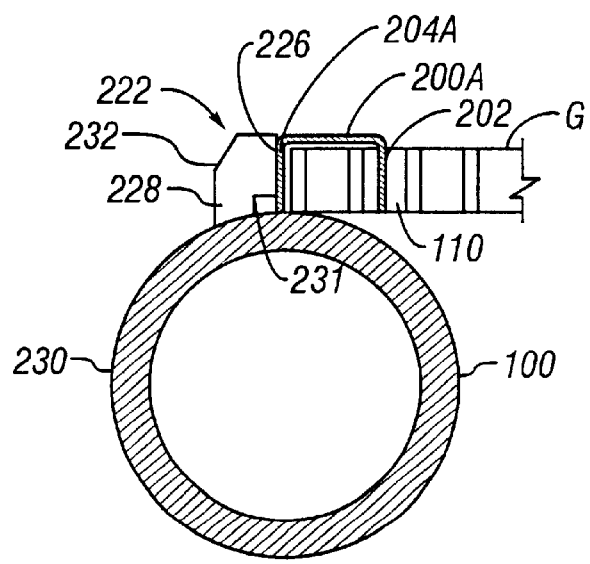
FIG. 4 is a cross sectional side view of the edge fastener of FIG. 3.

There may be situations in which it is desirable to permanently secure the grating to the 30 structural support members of an offshore platform. Thus, the present invention is directed to a permanent edge fastener 10A for permanently securing the edge of grating G to one of the structural support members 100. As illustrated in FIGS. 3 and 4, the permanent edge fastener 10A has generally the same structure as removable edge fastener 10, including a rectangular upper plate section 200A with a rectangular sidewall 204A integral with the plate section 200A. The sidewall 204A extends downwardly from the plate section 200A along the edge of the grating G parallel to the support members 100. The height of the sidewall 204A is approximately equal to or slightly greater than the thickness of the grating G in a preferred embodiment.

Sidewall 204A of the edge support 10A is permanently secured to the structural support member 100 through one or more generally right-angled braces 222 that are welded to an outside surface 224 of sidewall 204A. Angled brace 222 has a first leg 226 that is attached to sidewall 204A, preferably by welding, and a second leg 228, that attaches to the supporting surface of the support member 100. Edge 230 of second leg 228 has a curved radius that is configured to match the pipe diameter radius of the support member 100. In a preferred embodiment, the inside portion of the brace 222 is a right-angle corner 231 that produces a gap between the angled brace 222 and support member 100. However, any shape that produces a gap at the inside corner is contemplated. In a preferred embodiment, a portion of the outside light-angled corner 232 of brace 222 can be removed in order to eliminate the sharp outside corner edge. The width and height of brace 222 is dependent upon the size and/or diameter of the support member 100. Preferably, the braces 222 are spaced a 12″ centers along the length of the sidewall 204A.

In one embodiment, a plurality of downwardly extending teeth or claws 202 can be located at the inner edge of the plate section 200A, opposite the sidewall 204A. In a preferred embodiment, the teeth or claws 202 are spaced such that each one of the claws 202 extends downwardly inside one grid opening 110 when the plate section 200A extends over the grating G.

To permanently secure the grating G to the support member 100, the grating G is set in place and edge fasteners 10A are positioned over the grating G such that they grip the edges of the grating G along the length of the generally rectangular edge fastener 10A. Each angled brace 222 is then welded to the upper surface of the structural support member 100. After welding is completed, the paint repair to the weld affected areas is performed. The curved radius edge 230 of the second leg 228 and the inside light-angled corner 231 allow for continuous seal welds between the braces 222 and support members 100, which eliminate any corrosion.

The permanent edge fasteners 10A of the present invention are generally used when it is desirable to install a long continuous walkway in which the grating panels or sheets are laid end-to-end, for example in a walkway with dimensions of 4 feet wide by 40 feet long. By example, four grating panels of 4 feet by 10 feet are laid end-to-end on top of the walkway support members and edge fasteners 10A are installed along both sides of the walkway. In many instances, the plate fasteners 20 and 30 are also used in conjunction with the permanent edge fasteners 10A. This is a preferred method of securing the fiberglass grating to the underlying support members in the wave zone areas of an offshore platform or other similar platforms where the gratings are subjected to wave pressures exerted by strong wave action of other hydraulic forces.

On offshore platforms large areas of grating are used to form a landing or base of a stair in which the grating panels are side-by-side rather than end-to-end. In this situation, the edge fasteners 10A cannot be used because they extend above the surface of the grating and this would create a hazardous tripping situation. Instead plate fasteners 20 and 30 are used to install the grating panels by placing the plate fasteners 20 and 30 along the longitudinal sides of the grating panels. When properly tightened, plate fasteners 20 and 30 provide the vertical support necessary to resist vertical wave pressures, while providing some lateral support in order to resist horizontal wave pressures. The permanent edge fasteners 10, 10A provide the necessary support in both lateral and horizontal directions.

One skilled in the art will readily appreciate that the present invention is well adapted to carry out the objects and obtain the ends and advantages mentioned, as well as those inherent therein. The inventive edge fasteners described herein are presently representative of the preferred embodiments, are exemplary and are not intended as limitations on the scope of the invention. Changes therein and other uses will occur to those skilled in the art which are encompassed within the spirit of the invention and are defined by the scope of the claims.

What is claimed is:

1. An improved apparatus for permanently securing a grating sheet comprised of parallel and transverse bars forming a pattern of openings to a structural member, the apparatus includes an elongated generally L-shaped connector having an upper plate section generally rectangular in shape for mounting on an upper surface of the grating sheet, a downwardly extending sidewall formed integrally with the plate section and adapted to extend along a longitudinal edge of the grating sheet in which the sidewall has an outer surface, the improvement comprising:
   at least one generally right-angled brace attached to the outer surface of the sidewall for permanently securing the L-shaped connector to the structural member, the brace having an edge with a curved radius configured to conform to an outer surface of the structural member, wherein the apparatus is formed of corrosion resistant material and is able to withstand the forces of waves in a wave-zone portion of an offshore platform.

2. The apparatus of claim 1, wherein the plate section includes a downwardly extending series of teeth formed integrally with the plate section and extending parallel to the sidewall for insertion in the openings between the bars of the grating sheet.

3. The apparatus of claim 1, wherein the structural member is a pipe having a pipe diameter and the curved radius of the brace edge is configured to match the pipe diameter.

4. The apparatus of claim 1, wherein a plurality of braces are attached to the outer surface of the sidewall for securing the L-shaped connector to the structural member.

5. The apparatus of claim 1, wherein the corrosion resistant material is stainless or carbon steel.

6. The apparatus of claim 1, wherein the corrosion resistant material is fiberglass.

7. An improved apparatus for securing a grating sheet comprised of parallel and transverse bars forming a pattern of openings to a structural member, the apparatus including an elongated generally L-shaped connector having an upper plate section generally rectangular in shape for mounting on an upper surface of the grating sheet, a downwardly extending sidewall formed integrally with the plate section and adapted to extend along a longitudinal edge of the grating sheet in which the sidewall has an outer surface and a plurality of downwardly extending teeth formed integrally with the plate section and spaced apart from each other for insertion in between the grating bars, the improvement comprising:
   at least one generally right-angled brace attached to the outer surface of the sidewall for permanently securing the L-shaped connector to the structural member, the brace having an edge with a curved radius configured to conform to an outer surface of the structural member, wherein the apparatus is formed of corrosion resistant material and is able to withstand the forces of waves in a wave-zone portion of an offshore platform.

8. The apparatus of claim 7, wherein the structural member is a pipe having a pipe diameter and the curved radius of the brace edge is configured to match the pipe diameter.

9. The apparatus of claim 7, wherein a plurality of braces are attached to the outer surface of the sidewall for securing the L-shaped connector to the structural member.

10. The apparatus of claim 7, wherein the corrosion resistant material is stainless or carbon steel.

11. The apparatus of claim 7, wherein the corrosion resistant material is fiberglass.

* * * * *